United States Patent [19]

Briggs, Garry L.

[11] 4,328,038
[45] May 4, 1982

[54] RESIN COATED ALUMINUM

[75] Inventor: Briggs, Garry L., Edmonton, Canada

[73] Assignee: BJ-Hughes Inc., Houston, Tex.

[21] Appl. No.: 206,508

[22] Filed: Nov. 13, 1980

[51] Int. Cl.³ .............................................. C04B 21/02
[52] U.S. Cl. .................................... 106/87; 106/290; 106/291; 428/403
[58] Field of Search .................. 106/290, 87, 291; 428/403

[56] References Cited

U.S. PATENT DOCUMENTS

| | | | |
|---|---|---|---|
| 2,120,468 | 6/1938 | Hybinette | 106/88 |
| 2,225,150 | 12/1940 | Bechtold et al. | 106/87 |
| 2,240,191 | 4/1941 | McKee | 106/88 |
| 2,288,556 | 6/1942 | Vollmer | 106/88 |
| 3,197,323 | 7/1965 | Rehmar | 106/314 |
| 3,575,900 | 4/1971 | Ponyik | 106/290 |
| 3,579,366 | 5/1971 | Rehmar | 106/314 |
| 3,697,070 | 10/1972 | McAdow | 106/290 |
| 3,709,707 | 1/1973 | Rehmar | 106/88 |
| 4,213,886 | 7/1980 | Turner | 106/290 |

*Primary Examiner*—James Poer
*Attorney, Agent, or Firm*—Robert A. Felsman; Charles D. Gunter, Jr.

[57] ABSTRACT

An expansive additive for cement compositions is provided of the type used in cementing oil and gas well bores. Aluminum particles are coated with a gasoline and water insoluble wood resin to provide added control over the nature and extent of gas generation in the slurry.

8 Claims, No Drawings

RESIN COATED ALUMINUM

BACKGROUND OF THE INVENTION

1. Cross Reference to Related Applications

This application is related to the co-pending application of Garry L. Briggs and Richard G. Gandy entitled "Expansive Admixture" filed Nov. 13, 1980, Ser. No. 206,507.

2. Field of the Invention

This invention relates to an improved expansive additive and method for cementing the annular space between the casing or pipe and surrounding formation in oil and gas wells.

3. Description of the Prior Art

Various methods have been suggested in the cementing arts for inhibiting shrinkage of cement compositions during setting and hardening. These methods have included the addition to the cement composition of gas delivering agents including powdered aluminum. See, for example, U.S. Pat. No. 2,120,468 to Noak Victo Hybinette entitled "Expanded Concrete and Process of Producing the Same", issued June 14, 1938.

In well bore cementing, the cement slurry is pumped down a pipe and up the annular space between the pipe and the surrounding earth formation. The slurry is allowed to set-up or harden in the annular space, thereby forming a rigid column which ideally forms a bond with the earth formation as well as with the metal pipe. Shrinkage in the cement column can result in small passageways, sometimes called microannuli, being formed across the diameter of the column. When this happens, formation fluids can migrate across the column and contaminate the producing zone. Inhibiting shrinkage in the cement column during setting serves to prevent the formation of microannuli and assures a good bond between the cement, pipe and formation.

Although the use of aluminum particles to expand cement is old in the art, several problems have existed in the past when aluminum particles were used as a gas generating agent. Aluminum is supplied in various particle sizes. When aluminum powders are heated to a certain temperature, the mass of the particle is so small that the entire particle may oxidize almost immediately resulting in a fire. In addition, aluminum powder, like flour or coal dust, is easily dispersed in the air during mixing operations and the like. When dispersed in the air in a certain proportions and ignited, the burning spreads from one particle to the next resulting in a violent explosion.

When aluminum particles are dry blended with cement and left on the shelf, oxidation of the unprotected aluminum particles occurs with time. The thin oxide film which is formed on the particles makes them less reactive when added to the cement slurry thereby reducing the expansive capacity of the slurry. Conversely, unoxidized aluminum particles may react immediately after being added to the slurry causing an expansion of the cement prior to placement in the well bore.

To overcome these problems, various methods for coating the aluminum particles have been suggested including the use of water soluble cellulose ethers, polymers of ethylene oxide, carboxy vinyl polymers, and polyethylene glycol. See, for example, U.S. Pat. No. 3,579,366 to Solomon J. Rebmar, entitled "Granulated Additive, Method of Making the Same, and Cementitions Grout and Concrete Compositions Containing the Same", issued May 18, 1971. Coating the aluminum particles reduces the chance of premature oxidation during storage and dry blending and lessens the explosive hazard.

In spite of these advantages, expansive additives in the prior art have tended to be problematical. Water soluble binders protect the aluminum particles from oxidation in a dry blend on the shelf but are quickly dissolved in the cement slurry. The immediate expansion which results may be acceptable for cast-in-place applications such as blocks, slabs, and panels, but is not suitable for well cementing where slurries must first be pumped into place in the well bore. Immediate expansion results in a lack of control over the oxidation in the slurry and an unevenly expanded column. The polyethylene glycol system is liquid based and lacks the convenience of a dry system which can be pre-blended with cement in the correct proportions and stored in a sack. Also, certain of the prior art expansive additives required catalysts or inhibitors which had adverse effects on other properties of the set cement such as lowering the compressive strength.

SUMMARY OF THE INVENTION

It is therefore an object of this invention is to provide an expansive additive and method for cementing wells which gives a tight bond between the pipe, cement, and surrounding formation and which inhibits the formation of microannuli in the cement column.

Another object of this invention is to provide an expansive additive and method for cementing wells which enables control of shrinkage of a cement composition during its entire setting and hardening. It is also an object of this invention to provide an admixture and method for obtaining improved control over the nature of gas generation in the slurry and its duration.

Another object of this invention is to provide an expansive additive and method for cementing wells which does not detract from the other desirable properties of the cement system.

Accordingly, the expansive additive of this invention comprises coated aluminum particles wherein the coated aluminum particles are coated with a gasoline and water insoluble wood resin. A cement composition comprising cement, sufficient water to effect hydraulic setting of the cement, and the expansive additive in a range from about 0.05 to 1.0 weight percent based on the dry weight of cement is also disclosed.

A method for cementing the annular space between the pipe and surrounding formation in oil and gas wells is taught. The method comprises first preparing a pumpable slurry including cement, sufficient water to give a pumpable slurry, and approximately 0.2 weight percent of the expansive additive based on the dry weight of cement. The slurry is then pumped into the annular space between the pipe and surrounding formation in the well bore and allowed to set.

DETAILED DESCRIPTION OF THE INVENTION

The term "cement composition", as used herein, is intended to included those inorganic cements which harden or set under water and may be admixed with extenders and fine aggregate or the like, and includes settable hydraulic cements. Cement compositions of this type are prepared in the form of a fluid pumpable slurry which is introduced into the well bore through the casing or pipe.

The present expansive additive for use in cement compositions includes aluminum particles which have been coated with a gasoline and water insoluble wood resin. The expansive additive can be dry blended into the cement composition.

Any source of finely divided, oxide free aluminum particles may be used in the practice of the present invention. The particle size can vary between about 100 and 325 mesh with the preferred particles size being 200 mesh. The explosive hazards posed by aluminum powders are greatly reduced as particle size is increased. For this reason, use of particles smaller than 100 mesh is not recommended.

Conversely, as the particle size increases, the reactive surface area of the aluminum decreases with a resulting decrease in expansive capability of the admixture. The preferred aluminum particles are produced by The Alcan Corporation and sold under the brand name Alcan MD-201. The MD-201 particles are greater than 99 perent pure aluminum with an apparent density of 0.65 grams/cc, an approximate bulk density of 40 lbs./cu.ft., and are approximately 200 mesh size.

The aluminum particles of the present invention are coated with a gasoline and water insoluble wood resin, commercially sold by Hercules, Inc., under the trade name "VINSOL", referred to herein as the "resin". The resin can be produced by extracting resinous pine wood with a coal tar hydrocarbon, removing the hydrocarbon by evaporation, leaving a residue comprising a mixture of wood rosin and the gasoline and water insoluble resin. The resin then is separated from the wood rosin by extracting the latter by a suitable petroleum hydrocarbon in which the wood rosin is soluble.

The aluminum particles are coated as follows:

Approximately 20 grams of the resin and 200 ml of methanol are placed in a Waring blender and mixed at low speed for 2 to 4 minutes. Approximately 100 grams of MD-201 aluminum particles are placed into a container. The resin-methanol solution is poured over the aluminum particles taking care that all of the particles contact the resin-methanol solution. The excess solution is poured off and the remaining particles are stirred while a mild heat source is applied and allowed to dry. The coated particles are then passed through a 100 mesh wire screen. Upon drying, the coated particles are approximately 10 percent by weight resin and 90 percent by weight aluminum.

The nature of the hydraulic cement as well as the conditions of use determine the amount of additive which is to be used. Accordingly, the quantity of the additive should be determined for each batch of cement and intended use. This determination is made utilizing standard testing procedures such as those, for example, specified by the American Petroleum Institute (API) under various API RP titles.

The additive of the present invention is provided in an effective amount to give a cement composition which initially expands in 1–4 hours and continues to expand for upwards of 20 days at a controlled rate. The expansive additive is utilized in amounts ranging from about 0.05 to 1.0 weight percent based on the dry weight of cement. Up to about 5,000 feet, the expansive additive is utilized in a range from about 0.05 to 0.15 weight percent based on the dry weight of cement with the preferred amount being approximately 0.1 weight percent. From about 5,000 feet to 14,000 feet, the expansive admixture is utilized in a range from about 0.15 to 0.25 weight percent based on the dry weight of cement with the preferred amount being approximately 0.2 weight percent. At depths greater than about 14,000 feet, the expansive admixture is preferably used in amounts in excess of about 0.2 weight percent based on the dry weight of cement.

The expansive additive is generally utilized in a slurry which includes at least a hydraulic cement, water, and the expansive additive. The proportions of the various ingredients in the slurry vary depending upon its intended use and the nature of the cement, the water, and the expansive additive. Other materials such as fillers, dispersants, retarders, and accelerators can conveniently be utilized in the slurry along with the expansive additive of the present invention. Water is generally utilized in quantities ranging from 30 to 150 weight percent, preferably 35 to 65 weight percent based on the dry weight of cement.

In practicing the invention, a pumpably slurry is prepared which includes cement, sufficient water, and an effective amount of expansive additive. The slurry is then pumped into the annular space between the pipe and surrounding formation in the well and allowed to set.

In table I which follows, a cement containing the expansive additive of the present invention is compared to a neat cement. The figures are the results of three runs and are the average. Canada class "G" oil well cement containing 44 weight percent water was used to make up the slurries.

The slurries were prepared using a Waring blender as the mixer. The water was placed in the blender jar. The dry cement was then added, in 15 seconds or less, to the water as stirring was continued at low speed. In one case, the cement was a neat cement containing no additives. In the other case, the expansive additive of the present invention had been pre-blended with the dry cement prior to adding the same to the water. When all the dry cement had been added to the water, the stirring was increased to high speed for 35 seconds. The mixture was then placed in an atmospheric pressure consistometer and stirred for 20 minutes. The mixture was then restirred for 35 seconds at high speed on the Waring blender and 102 mls. were poured into a 250 ml., graduated cylinder. The cylinder was sealed and allowed to stand. The volume increased were read in half hour intervals. The results are shown in table I.

Thickening time is the time required for a cement slurry of a given composition to reach a consistency of 100 Bearden units of consistency (Bc), determined by methods outlined in the American Petroleum Institute (API) RP 10 B dated December 1979. Compressive strength is the degree of resistance of a material to force acting along one of the axes in a manner tending to crush it. Bond strength is a measure of the strength of the bond which exists between the cement and casing or formation. Thickening time, compressive strength, and bond strengths were determined for a neat cement slurry and a slurry containing resin coated aluminum using the methods of API RP 10 B and ASTM publication C 227 52 T and the results tabulated in table I below:

TABLE I

|  | Neat cement Canada "G" 44% water (no additives) | Canada "G" cement 44% water + 0.2% resin coated al |
|---|---|---|
| Compressive Strength Schedule 5s 200° F., 24 hr. | 4525 psi | 4300 psi |
| Expansion @ 20° C. (in 250 ml graduated cylinder) | 102 ml | 102 ml |
| 30 min. | 0 | 111 ml |
| 1 hr. | 0 | 129 ml |
| 1½ hr. | 0 | 130.5 ml |
| 2 hr. | 0 | 132.0 ml |
| T.T. Schedule 5 125° F. | 90 min. | 90 min. |
| Bond Strength Schedule 5s 200° F., 24 hr. | 363 psi | 641 psi |

It should be apparent that an invention has been provided with significant advantages. The expansive additive of the present invention gives a cement composition which expands initially in 1–4 hours and continues to expand at a controlled rate for up to 20 days. A pumpable slurry can be prepared including cement, water, and the expansive additive. The slurry can then be pumped into the annular area between the pipe and surrounding formation in a well and allowed to set. The controlled expansion which takes place assures a tight bond between the pipe, cement, and surrounding formation and inhibits the formation of microannuli in the cement column. The resinous coating on the aluminum particles lessens the danger of premature oxidation on the shelf or during dry blending. The expansive additive does not detract from the other desirable properties of the cement system.

While it is apparent the invention has been shown in only one of its forms, it should be apparent to those skilled in the art that it is not so limited but is susceptible to various changes and modifications without departing from the spirit thereof.

I claim:

1. An improved particulate aluminum expansive additive having a controlled rate of expansion in a cement-water slurry, the improvement comprising:
   coating the aluminum particles with a gasoline and water insoluble wood resin;
   said resin coated particles being utilized in said cement-water slurry in the range of 0.05 to 1.0 weight percent based on the dry weight of cement to give a cement composition which initially expands in 1 to 4 hours and continues to expand for upwards of 20 days at a controlled rate.

2. The expansive additive of claim 1, wherein said resinous coating comprises about 10 percent by weight of the coated aluminum particles.

3. The expensive additive of claim 2, wherein said aluminum particles prior to coating range in particle size from about 100 to 325 mesh.

4. A cement composition comprising cement, sufficient water to reproduce a pumpable slurry, and an effective amount of an improved particulate aluminum expansive additive having a controlled rate of expansion in a cement-water slurry comprising coated aluminum particles wherein said particles are coated with a gasoline and water insoluble wood resin;
   said resin coated particles being utilized in said cement-water slurry in the range of 0.05 to 1.0 weight percent based on the dry weight of cement to give a cement composition which initially expands in 1 to 4 hours and continues to expand for upwards of 20 days at a controlled rate.

5. The cement composition of claim 4, including approximately 0.2 weight percent coated aluminum particles based on the dry weight of cement.

6. A method of producing an expansive cement composition, comprising:
   mixing cement, sufficient water to produce a pumpable slurry, and an effective amount of an improved particulate aluminum expansive additive, said expansive additive comprising resin coated aluminum particles wherein said aluminum particles are coated with a gasoline and water insoluble wood resin and are present in the range from about 0.5 to 1.0 weight percent based on the dry weight of cement, to give a cement composition which initially expands in 1 to 4 hours and continues to expand for upwards of 20 days at a controlled rate.

7. A method of cementing the annular space between the pipe and surrounding formation in oil and gas wells, comprising:
   preparing a pumpable slurry including cement, sufficient water to provide a pumpable slurry, and an effective amount of an expansive additive, said expansive additive comprising from about 0.05 to 1.0 weight percent aluminum particles based on the dry weight of cement, said aluminum particles being coated with a gasoline and water insoluble wood resin to give a cement composition which initially expands in 1 to 4 hours and continues to expand for upwards of 20 days at a controlled rate; and
   pumping the slurry into said annular space and allowing said slurry to set.

8. The method of claim 7, wherein said expansive additive comprises approximately 0.2 weight percent resin coated aluminum particles based on the dry weight of cement.

* * * * *